Jan. 4, 1938.   C. A. BREWER   2,104,580
MOTOR VEHICLE CONTROL MECHANISM
Filed Nov. 9, 1929   2 Sheets-Sheet 1
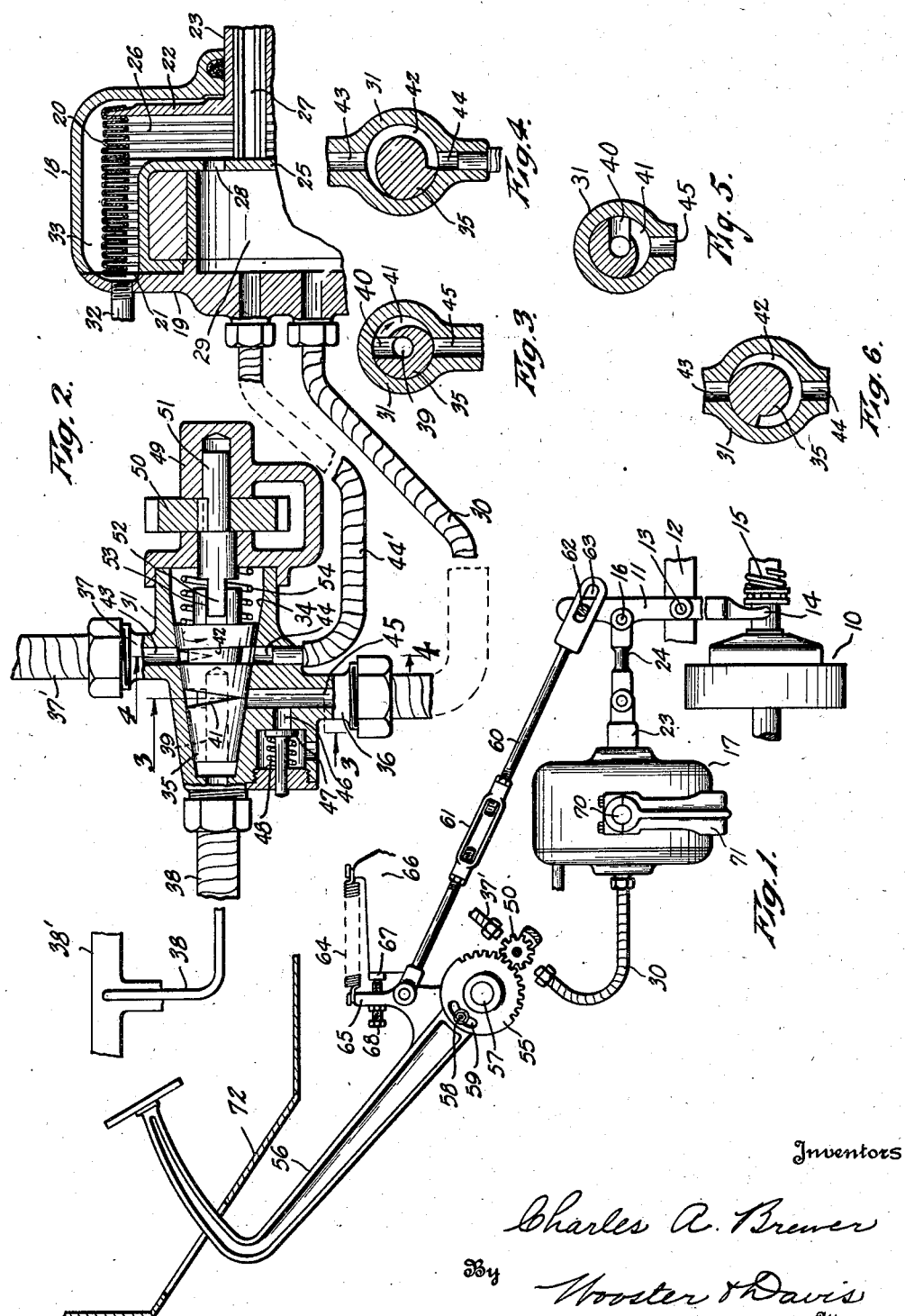

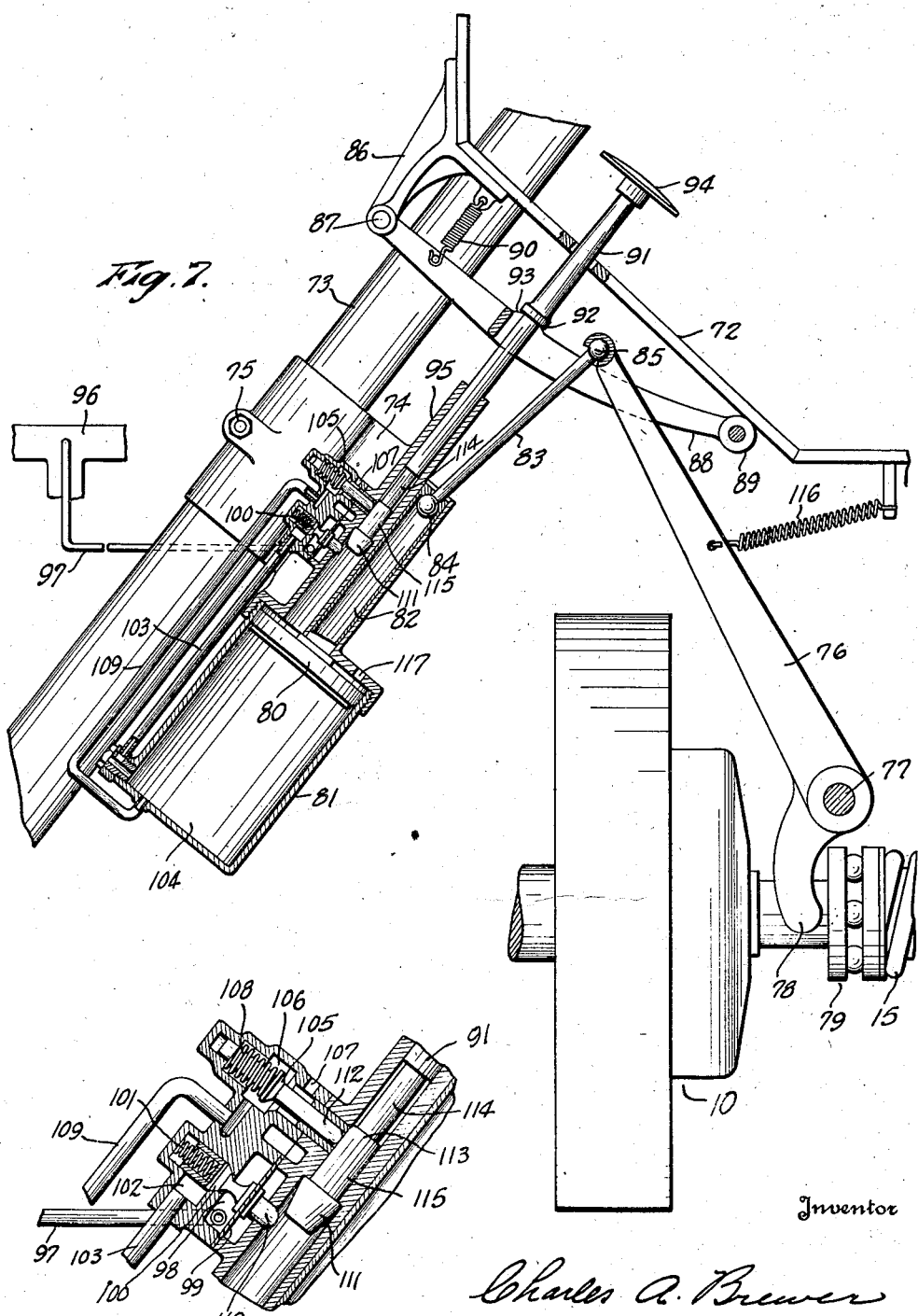

Patented Jan. 4, 1938

2,104,580

UNITED STATES PATENT OFFICE 2,104,580

MOTOR VEHICLE CONTROL MECHANISM

Charles A. Brewer, Noroton Heights, Conn., assignor of one-half to Philip J. Kury, Arverne, N. Y.

Application November 9, 1929, Serial No. 406,019

5 Claims. (Cl. 192—91)

This invention relates to control mechanism for motor vehicles, particularly to a clutch control mechanism, altho it could be used for controlling and operating the brakes, and has for an object to provide a mechanism which will control the clutch with a minimum effort on the part of the operator.

It is another object of the invention to provide a device which will give manual control of the clutch with practically effortless operation on the part of the driver.

It is also an object of the invention to provide a control mechanism in which there is a power device for releasing the clutch and controlling its engagement in normal operation of the vehicle with control mechanism for the power device which may be operated by the clutch pedal with the same movements as are now employed for releasing and controlling the clutch, but with very little effort on the part of the operator or may be controlled by a knob or button arranged to be depressed by the foot.

It is a further object of the invention to provide a control mechanism using a power device for releasing and controlling the clutch in which, should the power device fail, the clutch may be released and controlled independently thereof by means of the foot through the same means by which the power device is controlled. In other words, the control of the power means for controlling the clutch and the manual control means for the clutch should the power means fail is at the same point.

It is a still further object of the invention to provide an improved control valve mechanism for a fluid operated power device for controlling the clutch mechanism.

It is another object of the invention to provide a clutch control mechanism in which the clutch is released and its engaging movement controlled by a power device controlled by a personally operated lever or other control device in which the action of the power device depends on the amount of movement given to the lever or other control device and not the force or pressure applied to the lever.

A further object of the invention is to provide a device to duplicate regular foot operation and control of the clutch with a minimum of effort on the part of the operator.

With the foregoing and other objects in view, the invention consists in certain novel features of construction, combinations and arrangements of parts as will be more fully disclosed in connection with the accompanying drawings.

In these drawings:

Fig. 1 is a side elevation of a clutch control mechanism shown somewhat diagrammatically, including one form of my improved mechanism.

Fig. 2 is a detail section of the control valve and a part of the power unit of Fig. 1.

Fig. 3 is a detail section substantially on line 3—3 of Fig. 2.

Fig. 4 is a detail section substantially on line 4—4 of Fig. 2.

Fig. 5 is a section similar to Fig. 3 but showing the valve in position to bring the power unit in communication with the source of suction.

Fig. 6 is a section on the plane of Fig. 4 with the movable valve element in a position corresponding to Fig. 5.

Fig. 7 shows a modified construction and arrangement of the clutch control mechanism certain parts being in section to more clearly show the construction, and Fig. 8 is a section of the control valve of Fig. 7 on a somewhat enlarged scale.

Referring to Fig. 1, 10 represents a motor vehicle clutch of any suitable type. A suitable lever 11 is fulcrumed on a suitable support shown at 12, such as the frame at 13 and has the usual fork 14 for operating the clutch to release it against action of spring 15 and also to control its engagement.

A suitable power device 17 is connected to the lever 11 for controlling the clutch, that is to release the clutch and control its engaging movement. The device shown comprises an outer casing or housing 18 closed at one end by a cap 19. Mounted within the housing and secured to the cap is a flexible diaphragm 20. This diaphragm, as illustrated, is a bellows diaphragm connected at one end to the cap 19 by any suitable means, such as a disc 21. The opposite or free end of the diaphragm carries a disc 22 having an extension 23 passing out of the housing and guided for sliding movement therein. This extension 23 is connected by any suitable means, as a link 24 with the lever 11 at 16. Also carried by the head 19 within the housing and within the diaphragm 20 is an extension 25 which fills part of the space 26 within the diaphragm and thus reduces the fluid capacity of this space. This extension may have a guide stud 27 for the extension 23, and it has a passage 28 communicating with the chamber 29 in the extension. A conduit 30 leads from this passage to the control valve 31. A second conduit 32 leads from the space 33 outside the diaphragm 20 and communicates with the atmosphere. Preferably it is taken to some position within the car where it will not collect as much dust as it would if it opened outside.

The valve 31 is shown more in detail in Figs. 3 to 6. The casing has a tapered bore 34 in which is a similarly tapered rotatable plug 35. The casing has lateral branches 36 and 37, the branch 36 being connected to the conduit 30 while the branch 37 leads to the atmosphere through a conduit 37', and as in the case of the conduit 32, it is preferred to lead this conduit to the interior of the car where it will collect less dust and dirt. One end of the casing of the valve is connected by a conduit 38 with any suitable source of suction, such as the intake manifold 38' of the engine. The valve 35 has a longitudinal passage 39 leading from the end thereof so that it communicates with the conduit 38 and opening laterally through the side of the plug, as shown at 40. The wall of the plug also has a tapered groove or passage 41 communicating at one end with this latter passage 40 and opening through the side of the plug with its largest end in communication with the passage 40. Passage 41 is also in alignment with a passage 45 communicating with the conduit 30. The plug also has a similarly tapered groove or passage 42 in alignment with the branch 37 and passage 43 therein and quite a little longer than the groove 41, as will be seen from Fig. 4, it being in fact of sufficient length to lead from the passage 43 in the branch 37 to a passage 44 on the opposite side of the plug leading to a conduit 44' communicating with the chamber 29 in the power device. The passage 45 also leads to the plug 35 in the plane of the passage 41 so that in certain positions of the plug this passage 41 communicates with the passage 45. With the parts in the position shown in Figs. 1 to 4, the clutch is engaged or in driving position. It will be noted from Fig. 3 that the passage 41 is so located in the plug 35 that in this position the tip of this tapered passage or groove 41 is just out of communication with the passage 45 leading to the conduit 30 while as shown in Fig. 4 passage 44, conduit 44' and chamber 29 are in free communication with the atmosphere through the passage or groove 42 and conduit 37' thus equalizing the pressures on opposite sides of the diaphragm 20 in the power device. It will also be noted from Figs. 2, 3 and 4 that the two tapered grooves or passages 41 and 42 are tapered in opposite directions and are so located that as plug 35 moves clockwise the communication of passage 41 with passage 45 increases and the communication of passage 42 with passage 43 decreases. The passage 45 also communicates with the passage 46 leading outside the valve casing and controlled by a check or non-return valve 47 which is held against its seat by a spring 48. It will be apparent from Fig. 3 that this valve is so arranged that it will permit flow of fluid out the passage 46 if the pressure within the passage 45 exceeds atmospheric pressure, but will be normally closed to prevent entrance of atmospheric air.

Mounted in the cap or housing 49 closing the opposite end of the valve casing 31 and the conduit 38 is a gear 50 keyed to a shaft 51. This shaft is secured at its inner end 52 to the valve plug by any suitable means, such as by flattening the end of the shaft 51 and seating it in a cross groove 53 in the end of the valve plug. A spring 54 presses against the end of the valve plug 35 so as to make a tight connection between the valve and the casing 31 but permits the plug to turn in the casing.

The gear 50 meshes with a gear 55 connected with a foot lever or pedal 56 projecting through the foot board 72 and fulcrumed to any suitable support at 57, and the gear 55 may have annular adjustment with respect to this lever by any suitable means, such as a clamping bolt 58 extending through an elongated slot 59 in the gear. By loosening this bolt 58 the gear may be adjusted and then clamped in adjusted position, whereby the position of plug 35 and passages 41 and 42 may be adjusted relative to passages 44 and 45. The lever 56 is connected by any suitable connection, as a link or rod 60, with the lever 11, and it may include a turn buckle 61 for adjusting the length of this rod. It is connected to the lever 11 by means of a pin 62 in an elongated slot 63 so as to provide a lost motion connection between the lever 56 and the lever 11 which will permit limited movements of the lever 56 without operating the clutch. By adjustment of turn buckle 61 and gear 55 the parts may be adjusted so that pin 62 normally occupies a position in the bottom of slot 63 and the effort of the driver in depressing the clutch pedal 56 will be supplemented by the operation of the power device 17. A spring 64 tends to hold the lever 56 in its upright position, it being connected at one end to a lug or arm 65 on the lever and at its opposite end to some fixed member 66. There is also a fixed stop 67 cooperating with adjustable stop 68 on the lever to limit upward movements of the lever.

In operation the valve plug 35 is normally in the position of Figs. 2, 3 and 4 with the suction conduit 38 out of communication with the passage 45 and the power device, but with the passage 43 from the atmosphere in communication with the passage 44 and the power device through the groove 42 on the valve plug. Thus the space 26 within the diaphragm 20 is in communication with the atmosphere and the pressures are equalized on the opposite sides of the diaphragm. The diaphragm is, therefore, in its extended position of Fig. 2 and the clutch is held in engagement by the spring 15. The casing of the power device is preferably mounted on trunnions 70 so that it may rock if necessary, and the trunnions are mounted in a bracket 71 or other suitable support secured to the frame of the car. When the operator wishes to release the clutch he will depress the lever 56. The lost motion connection 62—63 is preferably so designed that the lever will have sufficient movement to shift valve 35 without transmitting any pressure from the foot to the clutch. This preliminary movement of the lever 56 will turn the valve plug 35 through the gears 55 and 50, and move the passage or groove 41 to communication with the passage 45. This movement will bring the suction conduit 38 in communication with the passage 45 and the space 26 within the diaphragm 20 and at the same time will shift groove or passage 42 to reduce the area of the communication between this space and passage 43 and thus with the atmospheric conduit 37'. The suction of the engine will now withdraw air from the space 26 and reduce the pressure therein causing atmospheric pressure on the outside of the plate 22 and the diaphragm 20 to force this plate inwardly with the extension 23, and therefore, draw on the linkage 24 to release the clutch. The clutch is, therefore, released by the power device as the pedal 56 goes down and without any more effort on the part of the operator than is required to operate the control valve 35, the suction on the power device increasing as the pedal goes down and further shifts the valve 35 to increase the communication of conduit 38 with conduit 30 and decrease communication of conduit 44' with the atmosphere through conduit 37'.

This device also provides a very effective control of the clutch engaging movement with little effort on the part of the operator. It will be apparent that the amount of communication of the passage 41 with the passage 45 and the amount of the communication of passage 42 with passage 43 is restricted will depend on how much the lever 56 is shifted or depressed. Thus a small movement of the lever will move the valve plug a short distance giving a restricted communication between passages 41 and 45. The suction through the pipe 38 will, therefore, only reduce the pressure in the space 26 in the diaphragm a small amount as air can flow in through the passage 42. However, as the tapers of passages 41 and 42 extend in opposite directions the more the communication of passage 41 with passage 45 is increased the greater is the communication between passage 42 with passage 43 decreased. Therefore, for any position of the valve plug 35 there will eventually be a balance between the two and the clutch will be engaged only a given amount for any given position of the valve plug. The result is that the clutch is not fully released by a small movement of the lever 56 and valve plug, but the pull applied to the clutch depends on the amount of depression or movement of the lever. Thus the operator can accurately control the amount of the application of the clutch, partly releasing it with a small movement of the lever if it is desired to slip the clutch as in parking in a small space, or fully releasing it by depressing this lever sufficiently to bring passage 41 in full communication with passage 45 and moving passage 42 out of communication with passage 43 as shown in Figs. 5 and 6 and, if desired, an intermediate degree of application may be secured with a corresponding movement of the foot lever. Thus with this arrangement the lever 56 can be very effectively used to control the engaging movement of the clutch with the same movement as where the pressure on the lever directly controls the clutch engagement as is now common practice, but in controlling this clutch engagement the pressure on the lever is only that required to shift valve plug 35 and overcome the pull of spring 64. Also the pressure required to release the clutch is only that required to overcome spring 64 and shift valve 35.

This device, therefore, duplicates regular foot operation of the clutch with a minimum of effort on the part of the driver.

It will be noted that the connection from the intake manifold of the motor to the chamber 29 of the power device is separate and independent from the connection to the atmosphere which also leads to chamber 29. This allows the suction to pull from this chamber and the atmospheric air to enter the chamber independently and in proportion to the valve adjustments. It has been found from actual tests that, therefore, the amount of suction pull on the power device could be varied over a wide range of pulling effort by the variation of the amount of opening of the valve controlling the connection with the intake manifold of the motor and the variation of the atmospheric valve, and that this could be done without slowing down or stalling the motor. It will thus be apparent that by adjusting turn buckle 61 and gear 55 the power device can be used as a booster to complement the effort exerted on the clutch pedal 56.

Should the power device fail the clutch may still be released and controlled by the lever 56. Depression of this lever will transmit pull directly to the clutch lever 11 as soon as the end of slot 63 engages pin 62. This will shift diaphragm 10 plate 22 to the left compressing the air in space 26. This, however, will not materially interfere with operation of the clutch by the lever as the valve 47 will move from its seat and permit this pressure to escape. The engaging movement of the clutch under these conditions will be controlled in the usual manner as where no power device is present.

In Figs. 7 and 8 I have shown a modified construction of the device for releasing and controlling the clutch in the same manner, but, instead of a pedal similar to the usual clutch pedal, employing a slidable button or knob to be operated by the foot. The power device may be of a different type, that shown being a piston sliding in a cylinder instead of a flexible diaphragm as shown in Fig. 2. It will be understood that the power device of Fig. 2 could be used with the control shown in Figs. 7 and 8 or the piston and cylinder form of power device could be used with the control of Figs. 1 to 6. The steering column is indicated at 73, and this power device may be mounted on this column below the foot boards 72 or on any other suitable support. As shown, it is mounted on a suitable bracket 74 clamped to the column by one or more bolts or screws 75. The clutch is indicated at 10 and is normally held in engagement by the spring 15. It may be released by a lever 76 fulcrumed at 77 and having the usual fork 78 for engaging the usual clutch abutment 79.

The power device shown comprises a piston 80 slidable in a cylinder 81 and connected to a hollow stem 82 to which a link 83 is slidable connected by a ball 84. A similar ball 85 connects the link 83 to the lever 76 to provide a universal joint.

Mounted below the foot board is a bracket 86 to which is fulcrumed at 87 a lever 88 carrying a roller 89 adapted to engage the top of lever 76, but normally held in raised position against the under side of the floor boards by a spring 90. Lever 88 is forked, one side of the fork being removed in the drawing and the roller 89 being mounted between them. Mounted between the sides of the forks is a slidable rod 91 having a flange 92 forming a shoulder to rest on the curved tops 93 on the sides of the fork. This rod projects upwardly through the floor boards 72 and carries a knob or button 94 in position to be depressed by the foot of the operator. This rod is guided for sliding movement in a guide 95 connected to the bracket 74 and serves to operate the control valves for the piston 80.

The piston is operated by suction from the intake manifold of the engine the same as in the first form. This intake manifold is indicated diagrammatically at 96, and a conduit 97 leads from the manifold to a chamber 98 above a flexible diaphragm 99 which is connected to a valve 100 normally held on its seat by a spring 101. This valve controls communication from chamber 98 to chamber 102 which is connected by a conduit 103 with the space 104 in the cylinder 81 below the piston 80. A second valve 105 controls communication from the chamber 106 with the atmosphere through a vent 107, and there is a spring 108 tending to move this valve toward its seat. Chamber 106 is in communication with chamber 104 in the cylinder through a pipe 109. The two valves 100 and 105 are controlled by the slidable rod 91. The valve 100 has a stem 110 with a rounded end to cooperate with the inclined cam surface 111 while the valve 105 has a stem 112 rounded at its lower end to cooperate with a rounded cam surface 113 connecting the reduced portion 114 and the larger portion 115 on the rod 91. The clutch lever 76 is normally held in its upper position by a spring 116.

In normal driving with the clutch engaged, the parts are in the position shown in Figs. 7 and 8, the valve 100 being closed to shut off communication of the intake manifold 96 with the cylinder and the valve 105 being held open by the enlarged portion 115 to place this cylinder in communication with the atmosphere through the vent 107. The piston 80 and lever 76 are now held in their upper positions by the spring 116, and the clutch is in engagement through action of the spring 15. If the driver now wishes to release the clutch, all he has to do is to press on the knob or button 94. This forces the rod 91 downward shifting the cam surface 111 into engagement with the end of the valve stem 110 to lift the valve 100 from its seat. This movement also causes the stem 112 of valve 105 to ride off the cam surface 113 over the reduced portion 114 which permits the spring 108 to force the valve 105 onto its seat and cut off communication of chamber 106 with the atmosphere. The chamber 104 in the cylinder below the piston is now in communication with the intake manifold 96 of the motor, and is out of communication with the atmosphere. The suction of the motor, therefore, reduces the pressure in the chamber 104 causing atmospheric pressure on the top of the piston to force it downwardly and through the link 83 operate lever 76 to release the clutch.

This device can also be used to control the clutch engagement the same as in the first form in the manner in which the clutch is now controlled direct by the foot. Thus, when it is desired to let the clutch back into engagement, the pressure on the knob 94 is gradually released the same as it would be in direct pedal operation of the clutch. This will permit the rod 91 to move upwardly sufficiently to partially close the valve 100 and partially open the valve 105 and thus decrease the suction in the chamber 104 and permit the piston to rise with proper speed depending on the amounts to which the two valves 100 and 105 are opened or closed. Thus, slight closing of the valve 100 and slight opening of the valve 105, will permit the piston to rise slowly while further closing of the valve 100 and further opening of the valve 105 will permit the piston to move upwardly more rapidly. Thus, the engaging movement of the clutch can be controlled by the foot the same as is described in connection with the first form of the device shown in Figs. 1 to 6, and to give the same clutch control as would be secured by direct foot operation of the clutch pedal. But this operation and control of the clutch is secured with minimum foot effort, all the effort being required is that necessary to shift the rod 91. As the roller 89 is normally some distance above the lever 76, the rod 91 may be depressed sufficiently to operate the valves 100 and 105 without transmitting direct pressure of the foot to the lever 76. This arrangement, therefore, forms a lost motion connection between the lever 88 and the lever 76 through which the lever 76 may be operated direct should the power device fail. In this event, that is, should the power device fail, depression of the knob 94 will force the lever 88 downwardly until roller 89 engages lever 76 and further movement of the knob 94 will force the lever 71 downwardly to release the clutch by direct pressure from the pedal, and engagement of the clutch may be controlled directly from the foot in the usual manner. Downward movement of the lever 76 independently of the piston is permitted by the ball connection 84 sliding in the guide 82 which forms a lost motion connection between the lever and the piston. An opening 117 may be provided in the cylinder above the piston to permit free passage of air.

Thus in either of the two forms of the device shown, there is a motor vehicle clutch control wherein the clutch is operated through a power means and both the release of the clutch and the control of the engaging movement is by this power means, and both operations are controlled by the operator by the same foot movements as in operating the regular clutch control but with a minimum effort as all the pressure that is required by the foot is that required to operate the control valves. However, should the power device fail, then the clutch may be operated and controlled directly by the foot with the same movements. It will, therefore, be evident that the control for the power device and the manual control means for the clutch should the power device fail are at the same point, and it is not necessary for the driver to learn a different technique to operate the clutch with this device either when using the power device or when the power device fails, and the operator without learning new operating movements is able to drive a car either with or without this power control.

Having thus set forth the nature of my invention, what I claim is:

1. In a control mechanism for motor vehicles, a fluid operated power device including a movable element connected to the control mechanism for operating it, a connection from the space at one side of said element to a source of suction, a separate connection from said space to the atmosphere, a control valve means comprising a rotary member having a passage for controlling each of said connections, said passages being tapered in opposite directions and arranged so that as the member rotates to gradually open one connection it simultaneously gradually closes the other, and manual means for operating said rotary member.

2. In a control mechanism for motor vehicles, a fluid operated power device including a movable element connected to the control mechanism for operating it, a connection from the space at one side of said element to a source of suction, a separate connection from said space to the atmosphere, a control valve means comprising a rotary member having a passage for controlling each of said connections, said passages being tapered in opposite directions and arranged so that as the member rotates to gradually open one connection it simultaneously gradually closes the other, a manually operated member connected to said rotary member for operating it, and a lost motion connection from the manually operated member to the control mechanism whereby it may be operated independently of the power device.

3. In a motor vehicle having a clutch to control transmission of power from the motor, a suction operated power device including a cylinder and a movable piston in the cylinder, a connection from the piston to the clutch, a connection from the cylinder on one side of said piston to the intake manifold of the motor, a separate connection from the same side of the piston to the atmosphere, a control valve for each of said connections, a slidable cam element for operating said valves having cam surfaces to gradually open one valve while gradually closing the other and vice versa, and a foot operated means for shifting said cam element.

4. In apparatus of the class described, the combination of a manually operable clutch actuating pedal, fluid pressure actuated means connected to said clutch pedal and adapted to exert a force tending to move said pedal in clutch disengaging direction, a valve for controlling said fluid pressure actuated means and mechanical connections between said valve and said clutch pedal whereby the initial movement of said pedal in either clutch engaging or clutch disengaging direction operates said valve.

5. In apparatus of the class described, the combination of manually operable clutch operating mechanism, fluid pressure actuated means connected to said clutch operating mechanism and adapted to exert a force tending to move said clutch operating mechanism in clutch disengaging direction, a valve for controlling said fluid pressure actuated means and mechanical connections between said valve and said clutch operating mechanism whereby the initial movement of said clutch operating mechanism in either clutch engaging or clutch disengaging direction operates said valve.

CHARLES A. BREWER.